United States Patent [19]
Tanaka et al.

[11] Patent Number: 5,157,975
[45] Date of Patent: Oct. 27, 1992

[54] CORIOLIS MASS FLOW METER EMPLOYING NON-METALLIC FLOW CONDUIT STRUCTURE

[75] Inventors: Shinichi Tanaka, Tokyo; Jun Morita, Yokohama; Hiroshi Yamamoto, Kanagawa, all of Japan

[73] Assignee: Micro Motion, Inc., Boulder, Colo.

[21] Appl. No.: 474,731

[22] PCT Filed: Dec. 16, 1988

[86] PCT No.: PCT/US88/04496
§ 371 Date: Dec. 23, 1989
§ 102(e) Date: Dec. 23, 1989

[87] PCT Pub. No.: WO89/11635
PCT Pub. Date: Nov. 30, 1989

[30] Foreign Application Priority Data
May 24, 1988 [JP] Japan .................................. 63-126399

[51] Int. Cl.⁵ .............................................. G01F 1/84
[52] U.S. Cl. ................................................ 73/861.38
[58] Field of Search ............ 73/32 A, 861.37, 861.38

[56] References Cited
U.S. PATENT DOCUMENTS

| | | | |
|---|---|---|---|
| 3,729,982 | 5/1973 | Senda | 73/32 A |
| 4,187,721 | 2/1980 | Smith | 73/861.38 |
| 4,217,774 | 8/1980 | Agar | 73/32 A |
| 4,793,191 | 12/1988 | Flecken et al. | 73/861.38 |
| 4,845,989 | 7/1989 | Titlow et al. | 73/861.38 X |

Primary Examiner—Herbert Goldstein
Attorney, Agent, or Firm—Mary Helen Sears; Stephen C. Glazier

[57] ABSTRACT

A Coriolis mass flow meter employing non-metallic flow conduit structure coupled and supported to distribute loads and reduce stresses on the flow conduit structure. The present invention discloses non-metallic flow conduit structures having corrosion-resistance and having suitable service temperature ranges, variation of Young's modulus and range of thermal expansion coefficient. A preferred embodiment includes support structures which distribute the loads on the flow conduit structure and pipe couplings which provide resilient solid mounting.

14 Claims, 6 Drawing Sheets

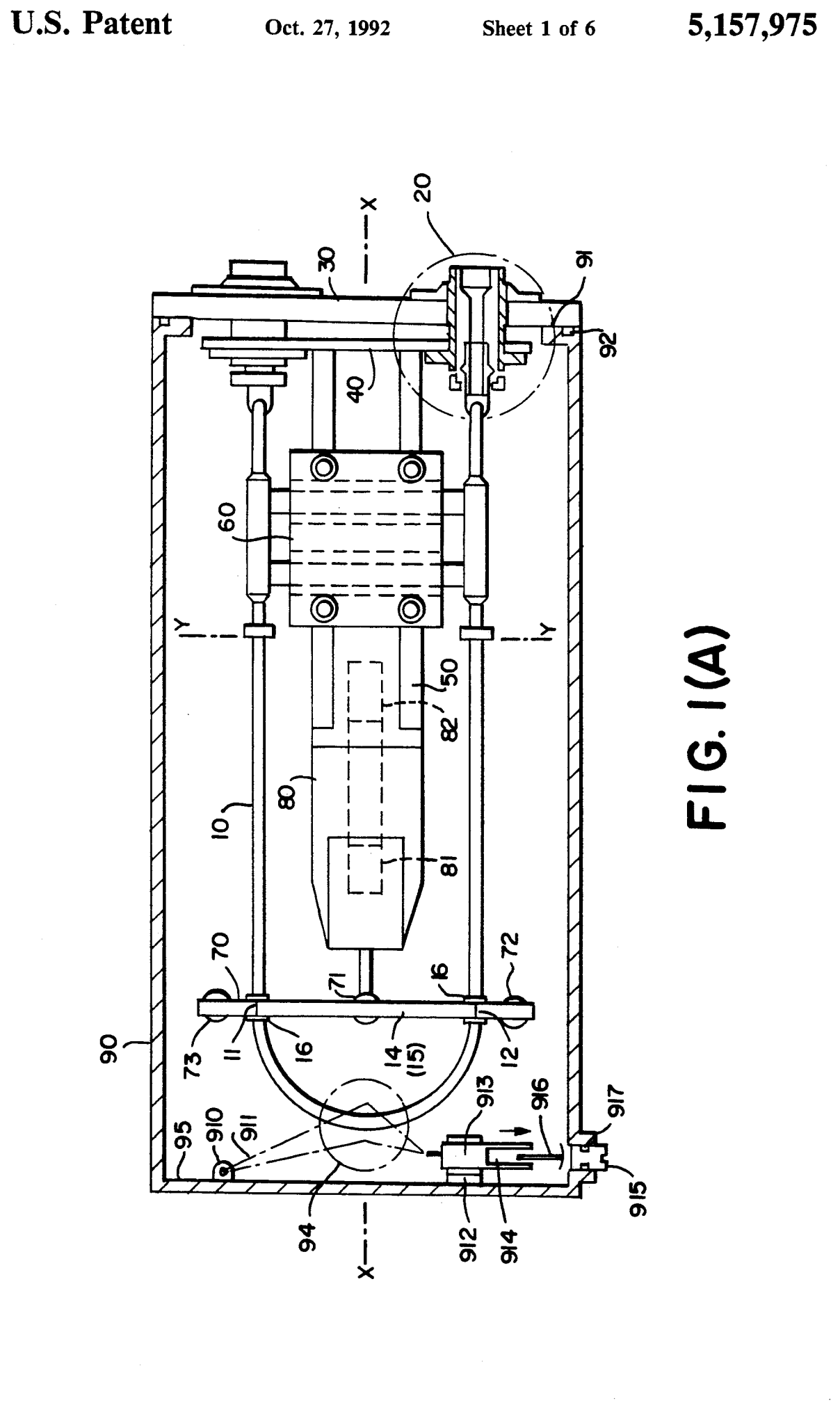

FIG. I(A)

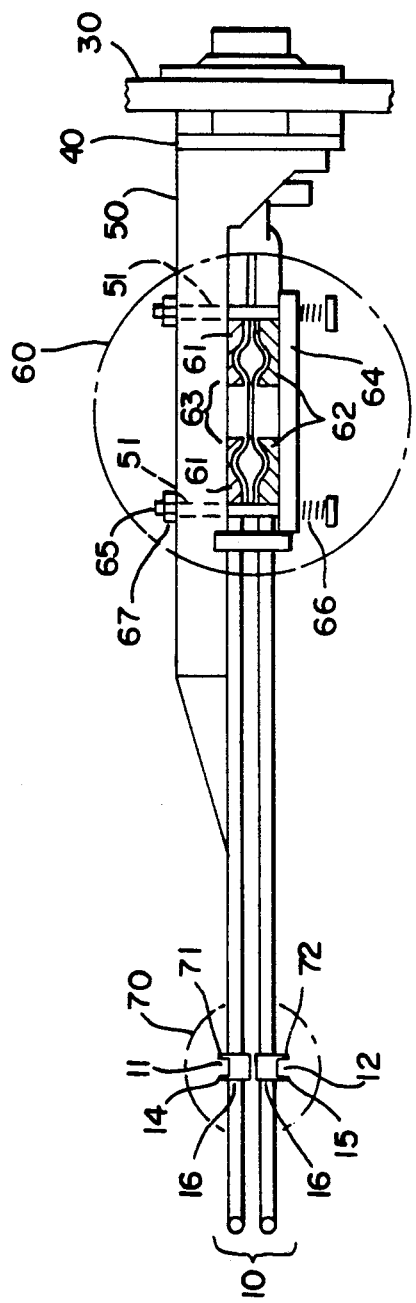
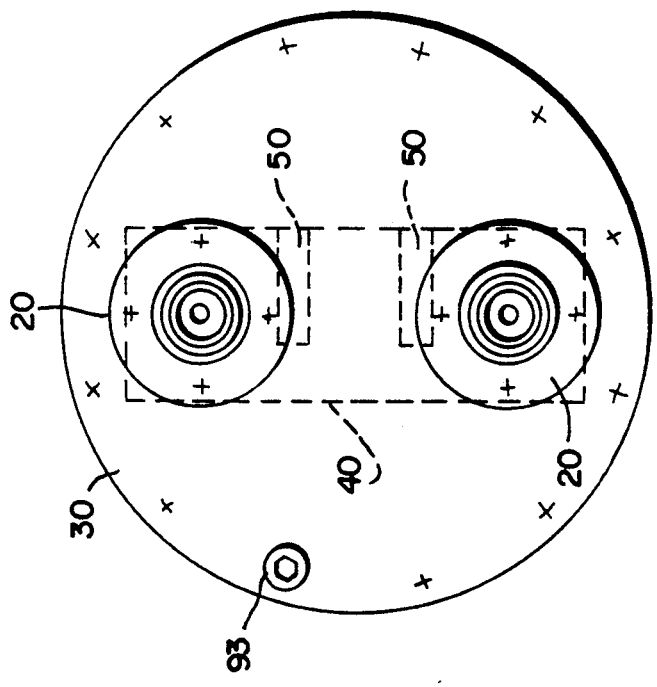
FIG. I(B)
FIG. I(C)

CORIOLIS MASS FLOW METER EMPLOYING NON-METALLIC FLOW CONDUIT STRUCTURE

DESCRIPTION

1. Technical Field

The present invention relates to a Coriolis mass flow meter wherein the flow conduits are fabricated from corrosion and temperature-resistant materials.

In a Coriolis type mass flow meter when fluid flows through an oscillated flow conduit, Coriolis forces are generated. The Coriolis force is represented as a vector product obtained by multiplying together two values—the rotational angular velocity of the conduit around an oscillation axis and the mass flow rate. In addition, the Coriolis force causes tiny displacements or deflections around a deflection axis of the flow conduit which is perpendicular to the oscilation axis.

The twisting torque from the deflections caused by Coriolis force is proportional to both the spring constant of the flow conduit and the twist angle around the deflection axis. Consequently, the mass flow rate is proportional to the twist angle and the spring constant. In a Coriolis flow meter comprising an oscillated flow conduit, any variation in the conduit's spring constant results in an error in the measurement value of the mass flow rate. The spring constant is inversely proportional to the Young's modulus of the flow conduit. Since the Young's modulus varies almost in inverse proportion to the temperature within a certain temperature range, the two phenomena compensate for one another.

2. Background Art

The Coriolis mass flow meters in current commercial use have flow tubes made of resilient metals and are hence susceptible to corrosion. Such corrosion may be caused by acids in flowing fluids which contact the crystal powder field in the conduit's inner surface, which field is created at the time the conduit is fabricated, as for instance, when a metal tube of stainless steel is bent during the fabrication process.

glass or ceramics have reduced susceptibility to corrosion. However, these materials in general have a low bending strength and are easily broken. In mass flow meter structures as described, e.g., in U.S. Reissue Pat. No. 31,450, the stress concentrates in the vicinity of the points at which the conduit is solidly mounted to its support. Consequently, it has been heretofore found by us to be impossible to provide a mass flow meter having long-term durability and stability which is constructed with a non-metallic flow conduit such as one of glass or ceramic material.

DISCLOSURE OF INVENTION

According to the present invention, quartz glass or similar glass, ceramic, or glass-ceramic materials of a low thermal expansion coefficient and a narrow Young's modulus range are used as the material for flow conduits and the meter design is modified to accommodate this change in the conduit material. The flow meters of this invention enable the measurement of the mass flow rate with high accuracy and without temperature compensation, even under markedly varying temperature conditions and at high temperatures. In addition, corrosion resistance can be improved.

The flow meter of the present invention exhibits satisfactory high temperature operability, improved corrosion-resistance and stress relief, and hence is durable. The present invention contemplates the use of flow conduits which are curved as constructed or which exhibit curvature when driven to oscillate, wherein the flow conduits are made of materials such as a special glass, ceramic, or hybrid glass-ceramic having suitable corrosion resistance, thermal expansion coefficient, variation in Young's modulus and appropriate service temperatures.

A flow meter embodiment of the invention was built of fused quartz, the properties of which are shown in Table 1 below. In addition, contemplated materials, examples of which are given, without limitation, in Table 2 below, are characterized by a low thermal expansion coefficient in the order of $0.5 \times 10^{-7}/°$ C. for titanium silicate glass, 5.6 to $7.5 \times 10^{-7}/°$ C. for silica glasses, $9.0 \times 10^{-7}/°$ C. for lithium-aluminosilicate glass-ceramic, 4 to $20 \times 10^{-7}/°$ C. for glass-ceramic 9608, and 32.5 to $51.5 \times 10^{-7}/°$ C. for borosilicate glasses, a narrow range of Young's modulus, typically from 9.8 to $10.5 \times 10^6$ psi for silica glasses, 7.4 to $9.4 \times 10^6$ psi for borosilicate glasses, and approximately $12.5 \times 10^6$ psi for glass-ceramics, and maximum service temperatures ranging from 800° to 1200° C. for silica glasses, 200° to 490° C. for borosilicate glasses, and approximately 700° to 800° C. for glass-ceramics.

Exemplary pipe couplings are described which enable metallic and non-metallic members to be stably and firmly coupled so as to act as a unit at the point of coupling. These couplings reduce stress on the conduit at the oscillation axis.

A preferred embodiment provides a flow conduit structure having one or more flow conduits made of a corrosion-resistant material such as glass or ceramic having suitable temperature operating range, thermal expansion coefficient and Young's modulus. The flow conduit structure is adapted at its ends to be held by stress-reducing pipe couplings which provide a resilient solid mounting to a primary support structure and serve to relay flow to the flow conduit's structure and return it from the flow conduit structure to a flow source or conduit external to the flow meter. An auxiliary support structure having connecting bars for connecting between the sides of the flow conduit structure is provided. This structure includes a resilient clamp which attaches the connecting bars to the primary support structure, distributing loads and thereby reducing the stresses on the pipe coupling resilient solid mounting and on the points about which the flow conduit structure oscillates.

Also described are several examples of pipe couplings for connecting metallic and non-metallic flow conduit sections so as to provide solid mountings in the conduit regions essentially coincident with the axis of oscillation of said conduits and to cause the joined metallic and non-metallic conduit segments to act as integral units at the respective coupling joints.

Finally, protective means for limiting flow conduit displacement during operation and during transport are described, as is a housing for protecting the meter and providing an observation port.

BRIEF DESCRIPTION OF THE DRAWINGS

FIG. 1 is a view for explaining a preferred embodiment of a Coriolis mass flow meter according to the present invention, wherein FIG. 1 (A) is a plan view thereof, FIG. 1(B) is a side view, and FIG. 1(C) is a front view; FIG. 2 is a view showing the main body of the present invention, wherein

FIG. 3 is a view showing a pipe coupling of the present invention, wherein

BEST MODE FOR CARRYING OUT THE INVENTION

Figure 2A:
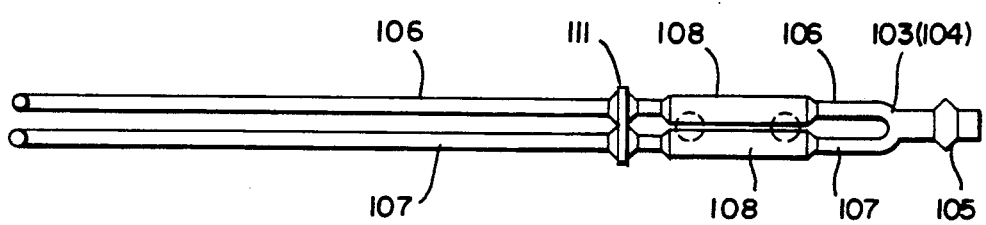
FIG. 2(A) is a side view thereof.

The operation and construction of the Coriolis mass flow meters upon which this invention rests is described in detail in U.S. Pat. Nos. Re 31,450; 4,422,338; and 4,491,025.

The invention described herein is applicable to any of the known embodiments of conduit shapes for Coriolis mass flow meters, including without limitation, those depicted in any of: U.S. Pat. Nos. 4,729,243; 4,747,312; 4,708,021; 4,716,771; 4,691,578; 4,711,132; 4,703,660; 4,660,421; 4,658,657; 4,680,974; 4,653,332; 4,628,744; European patent application numbers 0246510; 0239679; 0250706; 0210408; 0210308; 0212782; 0171937; 0253504; 0261435; 0261436; 0263719; 0271605; United Kingdom patent number 1597269; United Kingdom patent GB2167858B; and Patent Cooperation Treaty applications PCT/US87/01002 (published as W087/06691) and PCT/US85/01326 (published as W086/00699).

In addition, the invention herein is equally applicable to a single flow conduit flow meter as to a flow meter having more than one flow conduit.

A flow meter embodiment of the invention was built with a flow conduit of fused quartz generally characterized by the following properties shown in Table 1:

TABLE 1

| PROPERTIES OF GLASS TUBE USED IN METER | |
|---|---|
| Material: | quartz glass |
| Density: | 2.203 g/cm$^3$ |
| Modulus of longitudinal elasticity (Young's modulus) | 7.39 × 10$^3$ kgf/mm$^2$ |
| Modulus of transverse elasticity | 2.9 × 10$^3$ kgf/mm$^2$ |
| Poisson ratio: | 0.17 |
| Tensile strength: | 510 kgf/cm$^2$ |
| Compressive strength: | 11700 kgf/cm$^2$ |
| Bending strength: | 680 kgf/cm$^2$ |
| Torsion strength: | 300 kgf/cm$^2$ |
| Thermal expansion coef. | 5.5 × 10$^{-7}$/°C. (0–300° C.) |
| Normal service temp. | 900° C. |
| Maximum service temp. | 1100° C. |

As indicated elsewhere herein, various high temperature glasses, ceramics, and glass-ceramics known in the art, are contemplated. Suitable materials include, but are not limited to, those described in the following Table 2 based upon properties given in the Encyclopedia of Glass, Ceramics and Cement, M. Grayson Ed., 1985, John Wiley & Sons at pp. 480-87, 547-49 and in the Properties of Selected Commercial Glasses, publication B-83, copyright 1963, revised Mar. 1971, published by Corning Glass Works.

TABLE 2

| Material | Corning Glass Code | Composition (Weight %) | Thermal Expansion Coefficient × 10$^{-7}$/°C. | Young's Modulus, × 10$^6$ psi (*) | Maximum Service Temperature, °C. |
|---|---|---|---|---|---|
| borosilicate glass | 3320 | 76SiO$_2$, 2Al$_2$O$_3$, 15B$_2$O$_3$, 4Na$_2$O, 2K$_2$O, 1U$_3$O$_8$ | 40 | 9.4 | 200–480 |
| borosilicate glass | 7056 | 68SiO$_2$, 3Al$_2$O$_3$, 18B$_2$O$_3$, 1Li$_2$O, 1Na$_2$O, 9K$_2$O | 51.5 | 9.2 | 200–460 |
| borosilicate glass | 7070 | 72SiO$_2$, 1Al$_2$O$_3$, 25B$_2$O$_3$, 0.5Li$_2$O, 0.5Na$_2$O, 1K$_2$O | 32 | 7.4 | 230–430 |
| borosilicate glass | 7251 | 82 SiO$_2$, 2Al$_2$O$_3$, 12 B$_2$O$_3$, 4Na$_2$O | 36.5 | 9.3 | 230–460 |
| borosilicate glass | 7720 | 74SiO$_2$, 1Al$_2$O$_3$, 15B$_2$O$_3$, 4Na$_2$O, 6PbO | 36 | 9.1 | 230–460 |
| borosilicate glass | 7740 | 81SiO$_2$, 2Al$_2$O$_3$, 13B$_2$O$_3$, 4Na$_2$O, | 32.5 | 9.1 | 230–490 |
| borosilicate glass | 7760 | 78SiO$_2$, 2Al$_2$O$_3$, 15B$_2$O$_3$, 3Na$_2$O, 1K$_2$O, 1AS$_2$O$_3$ | 34 | 9.0 | 230–450 |
| borosilicate glass | 7800 | 72SiO$_2$, 6Al$_2$O$_3$, 11B$_2$O$_3$, 7Na$_2$O, 1K$_2$O, 1CaO, 2BaO | 50 | — | 200–460 |
| 96% silica glass | 7913 | 96.5SiO$_2$, 0.5Al$_2$O$_3$, 3B$_2$O$_3$ | 7.5 | 9.8 | 900–1200 |
| fused silica glass | 7940 | 99.9SiO$_2$, 0.1H$_2$O | 5.6 | 10.5 | 900–1100 |
| titanium silicate glass | 7971 | 93SiO$_2$, 7TiO$_2$ | 0.5 | — | 800–1100 |
| glass-ceramic | 9608 | 70SiO$_2$, 18Al$_2$O$_3$ 3Li$_2$O, 3MgO, 1ZnO, 5TiO$_2$ | 4–20 | 12.5 | 700–800 |
| lithium-aluminosilicate | 9617 | 74SiO$_2$, 20Al$_2$O$_3$ 3Li$_2$O, 2MgO, | 9.0 | — | — |

TABLE 2-continued

| Material | Corning Glass Code | Composition (Weight %) | Thermal Expansion Coefficient × $10^{-7}/°C$. | Young's Modulus, × $10^6$ psi (*) | Maximum Service Temperature. °C. |
|---|---|---|---|---|---|
| | | 1ZnO, 5TiO$_2$ Traces of F- | | | |

*Source: Properties of Selected Commercial Glasses, Corning Glass Works.

FIGS. 1 and 2 illustrate support structures in accordance with this invention for distributing loads exerted on flow conduit structures, thereby reducing stresses on the conduits. FIG. 3 illustrates pipe couplings which also distribute loads and reduce stresses while providing a resilient solid mounting.

FIG. 1 is an explanatory view showing a Coriolis mass flow meter according to a preferred embodiment of the present invention, wherein FIG. 1(A) is a plan view thereof, FIG. 1(B) is a side view thereof, and FIG. 1(C) is a front view as seen from the side to which an external conduit would be connected. The main construction comprises a flow conduit structure, referred to herein as a main body portion 10, having a pair of curved conduits made of quartz glass or a similar suitable material, as described above, and a pipe coupling 20 for solidly and resiliently joining the main body 10 to an external conduit (not shown in FIG. 1). Pipe coupling 20 joins main body 10 to an external conduit by means of a fixing plate 30 and a relay plate 40, a vise-like clamping means 60 mounted on a holding plate 50 unitarily fixed and attached to the fixed relay plate 40 for resiliently supporting the main body 10. Driving means and detecting means, along with the bracket means which mounts them to the flow conduits, all generally designated by numeral 70, are fixedly attached by a bracket means 14 and 15 to the curved portion of the main body 10, with the driving means 71 driving the pair of flow conduits of the main body 10, and the detecting means 72 and 73 detecting the Coriolis force generated when the conduits are driven to oscillate with fluid flowing through them. Preferably the detecting means are sensors which supply information concerning the phase shift, or time difference, between the passage of conduit portions adjacent the detecting means through corresponding predetermined points in the oscillation pathway. This information is obtained in a separate processing unit not shown in the drawings.

Figure 2B:
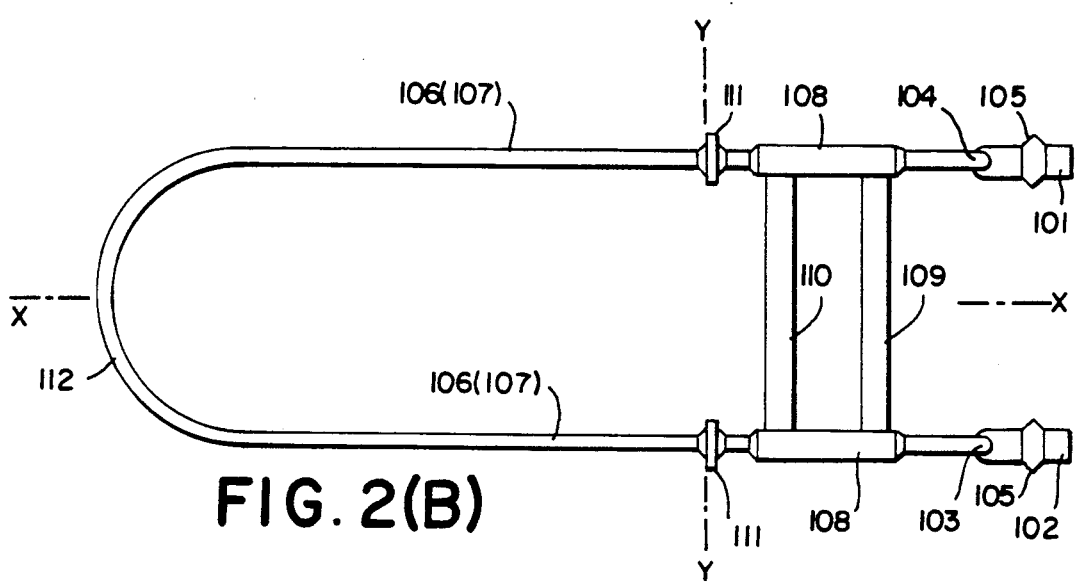
FIG. 2(B) is a plan view, and FIGS. 2(C1) and 2(C2) are views showing details of the main body.
Figure 2C:
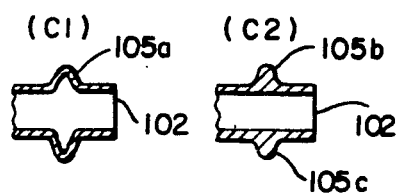

FIG. 2 shows the construction of the main body 10, wherein FIG. 2(A) is a side view thereof and FIG. 2(B) is a plan view thereof. In FIG. 2, XX is a first axis, the axis of symmetry and also the Coriolis deflection axis, and YY is a second axis, the oscilation or vibration axis. The respective axes are reference axes which are perpendicular to each other. The opening portions 101 and 102 serve as the fluid inlet and the fluid outlet for fluid to be measured, which respectively open at positions which are symmetrical in relation to the first axis, and further the same serve as both arms of the curved conduit and function as communication openings which communicate with the external conduit. In the vicinity of the opening portions 101 and 102, a solid collar 105 is fixedly mounted by welding or heat fusion onto the outer circumference near the opening portion 101 and 102. FIG. 2(C) is a lengthwise cross-sectional view of the collar portion 105.

FIG. 2(C1) shows the shape of a collar formed from the glass pipe itself. The position where the collar is to be formed is heated, and the diameter of the glass pipe at the intended collar position is enlarged, and thereafter the glass pipe is compressed in the direction of its axis. In such a way, a collar portion 105a is formed. In employing the method just described reduction of the thickness of the ridge portion lowers the strength thereof. Accordingly, said method is not within the purview of this invention.

Alternatively, FIG. 2(C2), shows the shape of the collar formed in accordance with the present invention. As shown in FIG. 2(C2), a solid member, for instance, a glass bar is wound around the outer circumference of the conduit. Thereafter, the glass is unitarily fused on the tubular body of the conduit by welding or heat fusion. In such a way, a collar portion 105b of high strength can be formed thereon. A flow divider portion 103 for the flow of fluid of substantially equal quantities into two conduits 106 and 107 is attached to flow conduits 106 and 107 at a position slightly downstream from the collar portion 105 on the inlet side and a flow combiner portion 104 for the recombining of these flow quantities is attached to flow conduits 106 and 107 at a position slightly upstream from the collar portion 105 on the outlet side. At a point downstream of the flow divider (flowing-in) portion 103 and at a point upstream of the flow combiner (flowing-out) portion 104, respectively, curved conduits 106 and 107 of the same shape and the same size, which are essentially symmetrical about the first axis, are fixed on supporting plates 111 in parallel with each other and at an interval of a predetermined distance. In such a construction, fluid to be measured is divided substantially equally in quantity of flow to each flow conduit. As shown in FIGS. 2(A) and 2(B), supporting plates 111, which connect conduits 106 and 107 at each side arm on the inlet side of the flow conduits, and also on the outlet side of the flow conduits, define the regions of location of the oscillation axis YY.

It should be noted that although FIG. 2 shows a curved flow conduit symmetrical in relation to the first axis, this is only one preferred example of the curved shape of the conduit. Any shape of conduit may be utilized that enables the generation of a Coriolis force couple while fluid is flowing through the conduit under oscillation conditions including shapes which exhibit curvature as a concomitant to driven oscillation.

In the preferred embodiment, predetermined sections of the upper curved conduit 106 and the lower curved conduit 107 are formed as enlarged inner diameter portions 108, situated in the areas between the supporting plates 111 and the flow divider portion 103 or the flow combiner portion 104, respectively. Connecting bars 109 and 110, both made of glass or a similar suitable material, are joined to inlet and outlet portions 108 by welding or heat fusing to the enlarged diameter portions 108 of the arms of the curved conduit in parallel with the second axis. Such enlarged diameter portions 108 prevent both the inner diameters of the upper and lower curved conduit 106 and 107 from being changed owing to the distortion of the conduits at the time of welding.

As a result, the velocity of flow through the vibrated flow conduits is prevented from changing.

The main conduit body 10 is resiliently held without being affected by vibrations or other forces received from the external conduit through the pipe coupling 20 or by the distortion caused at the time of manufacturing the main body 10. However, in order to stably install the main body 10 made of glass or similar material, it is necessary to distribute loads exerted on the support for the main body, and thereby reduce stresses at critical points. In the present invention, a vise-like clamping means designated generally by the numeral 60 is provided for clamping onto the main body.

The clamping means 60 holds the main body at the main body connecting bars 110 and 109. The clamping means 60 is attached to a pair of holding plates 50 parallel with the first (XX) axis, one end of which is fixedly attached to the relay plate 40 in symmetrical relation to the first axis. The clamping plates 61, having recessed grooves in parallel with the second (YY) axis at respective positions corresponding to the connecting bars 109 and 110 are fixedly attached to the holding plate 50 in parallel with the second axis. The other clamping plates 62 for clamping the connecting bars 109 and 110 so as to be opposite the clamping plates 61 are fixedly attached to a pressing plate 64.

The pressing plate 64 is clamped by use of a bolt 65 which passes through holes 51 bored coaxially on the pressing plate 64 and the holding plates 50 and is resiliently supported by a spring 66 and a nut 67 engaged with the bolt 65. Furthermore, a resilient plate 63 made of material such as silicone rubber or the like is inserted into the recessed grooves of the clamping plates 61 and 62 and the connecting bars 109 and 110 are resiliently clamped by means of the resilient plate 63. A terminal carrying plate 80 is attached to the other end of each holding plate 50, and a pair of terminal plates 81 and 82 are fixedly mounted on the terminal carrying plate 80, and the terminal carrying plate 80 including the terminal plates 81 and 82 relay lead wires for electrically connecting the terminals of the driving and detecting means that will be mentioned later.

The combination of the supporting plates 111 and of the connecting bars 109 and 110 resiliently held by the clamping means 60 attached to the relay plate 40 cooperate to distribute loads on the main body 10 so that the two flow conduits 106 and 107 have reduced stresses both at the YY axis and at the connection to the pipe couplings 20.

A pair of brackets 14 and 15, parallel with each other, are fixedly mounted in the vicinity of the tip end portions of the upper curved conduit 106 and the lower curved conduit 107 of the main body 10, respectively, on the positions of intersecting points 11 and 12, which lie along a line parallel to the second (YY) axis.

A driver, for instance, an electromagnetic drive means 71 for driving the upper and lower curved conduits 106 and 107 about the second (YY) axis in an opposite phase to one another, i.e. in the manner of a tuning fork, is mounted on brackets 14 and 15 at a location intersecting the first (XX) axis. Detectors, for instance, electromagnetic detectors, for detecting effects of Coriolis force and forwarding signals representing these effects to electronic processing means, e.g., as shown in the U.S. Pat. Nos. 4,422,338 and Re31,450 are fixed to brackets 14 and 15 on respective positions and at an interval of distance symmetrical to the first axis. Electromagnetic detectors contemplated include motion sensors which detect displacement, velocity or acceleration.

Fixing of the curved conduit to the brackets 14 and 15 is performed generally by the bracket grasping the curved conduit. However, since the curved conduit is made of glass, ceramic or glass-ceramic, friction is reduced and therefore both the bracket and the conduit are apt to slip relatively easily. Consequently, it is necessary to raise the grasping pressure for the purpose of mounting the bracket on the conduit for a long period of time. However, the above method can result in instability in the fixture. According to the result of an experiment performed by the present applicant, when a two-sided adhesive tape is wound around the curved conduit surface and the adhesive tape grasped by the bracket, the bracket can be mounted on the conduit without raising the grasping pressure. As discussed before, the lead wires of the driving means 71 and the detecting means 72 and 73 are guided out from a connector (not shown in FIGS. 1) mounted on the fixing plate 30 to the external source of power and signal monitoring (not shown in FIGS. 1) by means of the terminal plates 81 and 82.

Figures 3A, 3B, 3C:
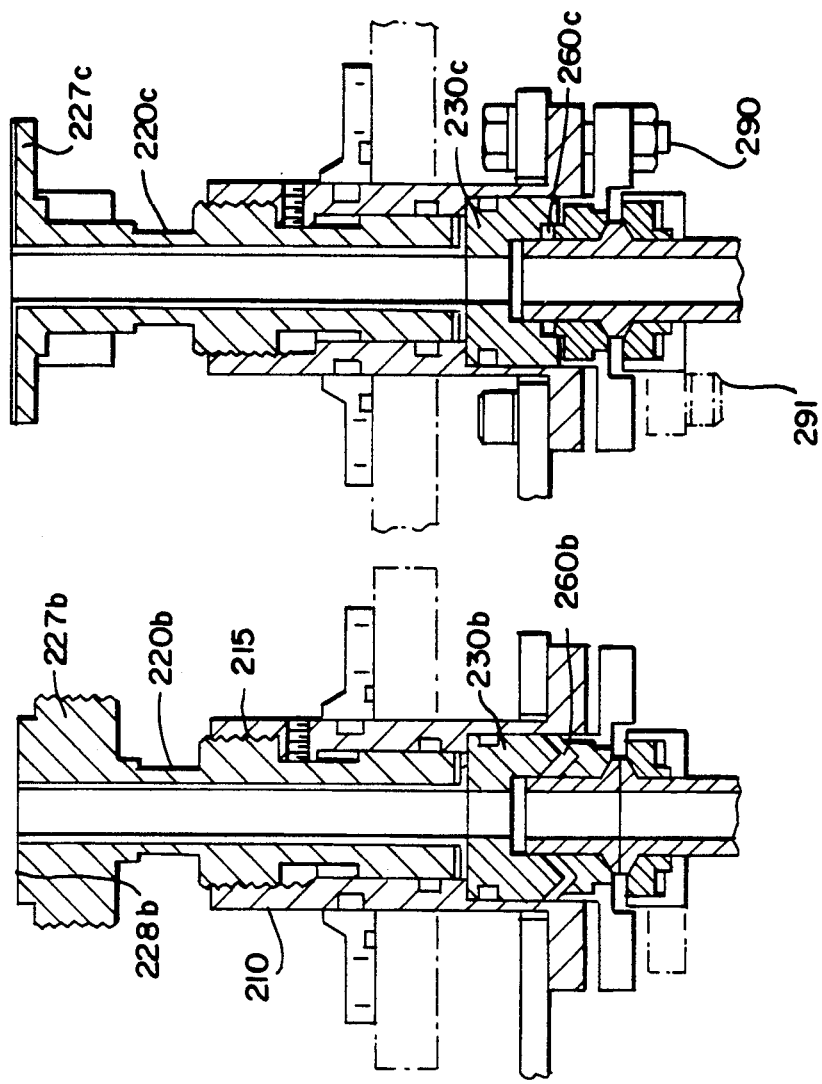
FIGS. 3(A), 3(B) and 3(C) show respective embodiments thereof.

FIG. 3 is a side cross-sectional view showing the pipe coupling 20 in detail, wherein FIG. 3(A) is a construction view showing its fundamental embodiment, FIG. 3(B) and FIG. 3(C) are views respectively showing other embodiments. In FIG. 3(A), the reference numeral 210 designates a first member. The first member 210 is a cylindrical body, made of type 5052 aluminum-magnesium alloy (ASTM B211-85, 5052) or the like, having a collar portion 211 at one end thereof and a passage 212 bored therethrough. A section of the passage 212 in the vicinity of the collar portion 211 is made a passage 213 of large inner diameter. The reference numeral 220 designates a cylindrical second member, made of AISI type 304 stainless steel or the like. The second member 220 is inserted into the first member 210 such that both members are engaged with each other by means of a threaded portion 215.

A screw 226 is inserted into a ring-shaped recess portion 225 in order to fixedly engage the second member 220 with the first member 210 so as not to rotate. The second member 220 serves as a part of the relaying passage for causing the main body 10 to communicate with the external conduit (not shown in FIG. 3). Therefore, for instance, the second member 220 is treated with a resin, such as polytetrafluoroethylene (PTFE) or the like, to form a lining 221. Consequent)y, a thread 222 for engaging with the external conduit is engraved in the resin lining, and a passage 223 is bored on the axis thereof in order to form a fluid-flowing passage. An O-ring 224 made of fluorocarbon rubber, available under trade names such as Viton (E.I. dupont de Nemours Company), Kalrez (duPont), Fluorel (3M), or Kel-F (3M), or a similar material is tightly inserted into the other end of the resin lining. Another O-ring 214 made of Viton or the like is tightly inserted onto the side surface of the second member 220 and against the first member 210. In such a way, a complete liquid seal can be obtained.

The reference numeral 230 designates a third member which is a cylindrical body made of resin such as PTFE or the like and which serves as a relaying portion between the resin lining 221 and the main body 10. A passage 231 of the same diameter as that of the passage 223 and an enlarged inner diameter hole 232 are bored in the third member 230. The third member 230 is inserted into the large inner-diameter passage 213 of the first member 210 so as to be liquid-sealed by an O-ring 233 made of Viton or the like. The opening portion 101 of the main body 10 is movably and loosely inserted into the large inner diameter hole 232 of the third member.

The reference numeral 260 designates a ring-shaped seal made of resin such as PTFE or the like which is inserted into the large inner diameter passage 213 and serves as a seal member for liquid-sealing the flow conduit opening portion 101 on the inner circumferential surface.

The reference numeral 240 designates a fourth member made of type 5052 aluminum-magnesium alloy or the like which is a collar 241 having unitarily mounted thereon a ring 242 partially and tightly inserted into the large inner diameter passage 213 and which inserts the opening portion 101 into the ring 242. One end of the fourth member 240 is brought into direct contact with the collar portion 105 of the opening portion 101. The resin lining material 243 (PTFE or the like) brought into direct contact with the ring-shaped seal is inserted into the other end of the fourth member 240.

The fifth member 250 made of type 5052 aluminum-magnesium alloy or the like is also a collar 251 consisting of a ring 252 unitarily mounted thereon. As is the case of the fourth member 240, resin-lining material 253 (made of PTFE or the like), for use in sealing in direct contact with the collar portion 105, is inserted into the ring 252.

The pipe coupling 20 constructed as discussed above, is combined with the relaying plate 40 by the use of a screw or the like at the collar portion 211 of the first member, and is fixedly mounted on the fixing plate 30 by means of a metal fixture 270 at the ring-shaped recess portion 216. In such a way, both of the fixing plate 30 and the relay plate 40 are fixed. The opening portion 101 of the main body is grasped at collar 105 by the resin linings 243 and 253 (each made of PTFE or the like), of the fourth and fifth members, respectively, and engaged, as with a screw (not shown) with the first member 211 at each of the collar portions 241 and 252. Since the external conduit is engaged with the threaded portion 222 and fixedly mounted on the fixing plate 30, the external vibrations are absorbed by the fixing plate 30 and the relay plate 40 so that the main body 10 is not influenced by external vibrations. In addition, the main body 10 is liquid-sealed by the ring-shaped seal 260 (made of PTFE or the like) so as to enable the opening portion 101 at collar 105 to be moved, at the third, fourth and fifth members. Consequently, even though the main body made of glass or other suitable material, as described above, is subject to distortions due to deflection, the main body can be solidly mounted stably on the fixing plate and installed without being affected by external vibrations.

In FIGS. 3(B) and 3(C), the first member 210 shown in FIG. 3(A) is commonly used, and both of the second members 220 to be connected with the external conduit and the ring-shaped seal 260 (made of PTFE or the like) at collar 105 of the opening portion 101 of the main body are replaced by elements of different configuration, as shown. With respect to the second members 220b and 220c (each made of type 304 stainless steel or the like), a part thereof to be inserted into the first member 210 is the same as that of FIG. 3(A). At the connecting portion thereof to be connected with the external conduit, the external conduit is engaged by threads with the second member 220 in FIG. 3(A). Alternatively, in FIG. 3(B), an external connecting portion 227b extending upward is added to the second member 220b, and an end surface 228b is formed on the top portion of the external connecting portion 227b. The second member 220b and the added external connecting portion 227b are unitarily combined with each other by use of an external connecting screw (not shown in FIG. 3) brought into direct contact with the end surface 228b. In FIG. 3(C), a collar 227c is formed on the other end of the second member 220c. The collar 227c is brought into direct contact with a packing (not shown in FIG. 3) and held by a flange or the like (not shown in FIG. 3). Alternatively, as the method of sealing the main body opening portion 101 at collar 105, an angular ring-shaped seal 260b (made of PTFE or the like) is used in FIG. 3(B), and an O-ring 206c made of PTFE or the like is used in FIG. 3(C).

FIG. 3(c) shows nut and bolt combinations 290 and 291 for connecting the first, fourth and fifth members together at their collars and attaching them to the relay plate.

Referring again to FIG. 1, the main body 10 is protected by a housing 90. The housing 90 is formed in a cylindrical shape, and the collar portion 91 formed at one end thereof and provided with a sealing means such as an O-ring or the like 92 embedded therein is liquid-tightly pressed and joined to the fixing plate 30 by use of a bolt or the like 93 (shown in FIG. 4, described bel .

A viewport 94 is liquid-tightly installed on the sur e of the housing 90 at a position capable of observing the tip end of the curved portion of the main body 10. In such a way, it might be possible to observe a pending accident such as leakage, etc. occurring in case the main body 10 is broken. In addition to that, it may be preferable to install a safety means for holding the tip end portion of the main body so as to protect it, for the purpose of preventing the main body 10 from causing a displacement larger than the limiting magnitude.

Figure 4A:
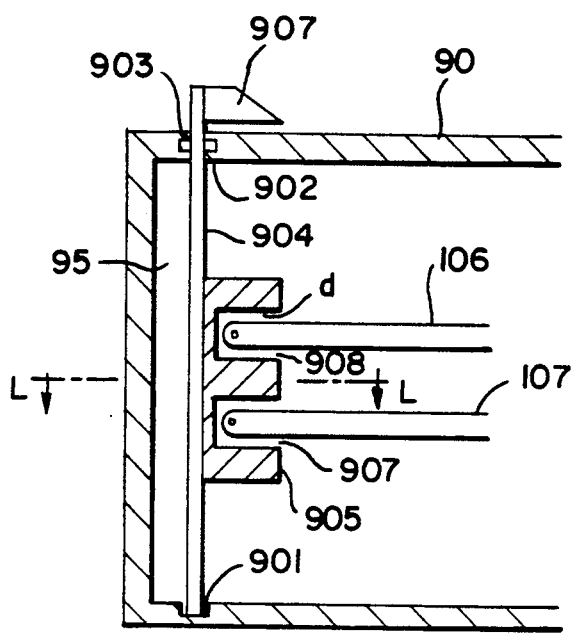
FIGS. 4(A) and 4(B) are views showing, respectively, an outline of displacement limiting plate constructions according to the present invention.

FIG. 4 is a construction view showing an embodiment of a safety means for protecting the tip end portion of the main body. In FIG. 4, a pivot 901 and a passage 902 are formed in the housing 90 in parallel with the bottom surface 95 of the housing 90. A supporting bar 904 is installed in the housing 90 such that one end of the bar 904 is put in the pivot 901 and another end of the bar 904 passes liquid-tightly and rotatably through the passage 902 by use of an O-ring 903 made of Viton or the like. A displacement limiting plate 905 shown in the side cross-sectional view of FIG. 4(A) is fixedly attached to the aforementioned supporting bar 904. The displacement limiting plate 905 is formed in the shape of an "E". A pair of recessed portions 907 and 908 of the displacement limiting plate 905, fixed to the supporting bar 905, are positioned such that both the recessed portions 907 and 908 receive, respectively, the upper and lower curved conduits 106 and 107 with a gap d therebetween as shown in FIG. 4(A). The value of the gap d is selected so that the gap d is within the scope of the resilient displacement to be allowed for the tip end portion of each curved conduit.

Figure 4B:
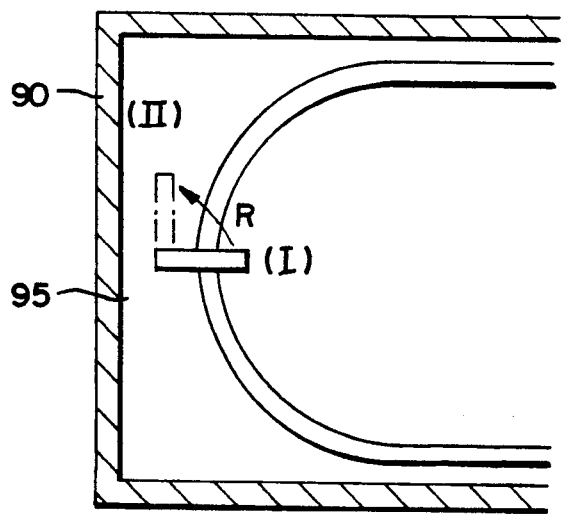

The displacement limiting plate 905 is illustrated in FIG. 4(A) with the plate 905 engaged between the flow conduits 106 and 107. FIG. 4(B) is a cross-sectional view taken along the section line LL of FIG. 4(A). In FIG. 4(B), the displacement limiting plate 905 is situated at a position shown by (I), and receives respectively both of the curved conduits 106 and 107 with the equal gap d for the purpose of preventing each conduit from displacing a distance greater than the gap d. Such a configuration can be employed when the meter is transported. When the mass flow meter is put into operation, the displacement limiting plate 905 can be rotated in a direction shown by an arrow R of FIG. 4(B) toward another position shown by (II), thereby disengaging the plate 905. Alternatively, it may also be possible to operate the mass flow meter in the position shown by (I) for the purpose of preventing each of the conduits 106 and 107 from displacing a distance greater than the gap d. A compass needle (pointer) 907 of the supporting bar 904 serves as an index for indicating the current position of the displacement limiting plate 905.

Referring back to FIG. 1, FIG. 1(A) shows another embodiment of a safety means. With respect to the safety means, a fixing ring 910 is fixedly mounted on the bottom surface 95 of the housing 90, and a resilient spring 911 is attached to a movable body 913, such that one end portion of the spring 911 is supported by the fixing ring 910 and the other end portion of the spring 911 is fixedly attached to the movable body 913 so as to move the same 913 linearly in the direction of its axis.

The movable body 913 is inserted into a fixing pedestal 912 fixedly mounted on the bottom surface 95 of the housing 90, and the same 913 can be moved in the direction of its axis by rotating the slit 914 formed at the end of the movable body 913. A plate-shaped body 916 is inserted into the slit 914, wherein the plate-shaped body 916 is constructed unitarily together with a rotating head 915. The rotating head 915 is inserted in the hole formed in the housing 90 by use of an O-ring 917, thereby forming a liquid-tight rotatable mount. In such a construction, the rotating head 915 is rotated by a screwdriver so that the slit 914 is rotated and thereby the movable body 913 is moved linearly in the direction of its axis.

The resilient spring 911 is stretched onto a stop on the tip end portion of the curved conduit, as shown by a solid tip end portion of the curved conduit, illustrated as a solid line in FIG. 1(A) in order to limit resilient displacement of the curved conduit whenever the mass flow meter is transported. The resilient spring 911 is released therefrom as shown by a dotted line in FIG. 1(A). With spring 911 released, the normal measurement of the mass flow rate can be obtained.

As is apparent from the foregoing description, according to the present invention, it is possible to provide a Coriolis mass flow meter for a wide range of applications comprising a main body made of glass, ceramic or glass-ceramic capable of handling the flow of intensively activated liquid which could not be handled by a metal conduit, and a holding means enabling stable successive measurements of mass flow rates to the same extent as would be possible using a metal conduit, and further comprising a stable relaying means capable of preventing the main body from being affected by the transmission of vibrations from the external conduit.

FIGS. 5 and 6 show additional examples of pipe couplings for connecting metallic tubes to non-metallic tubes to provide resilient solid mountings.

Figure 5A:
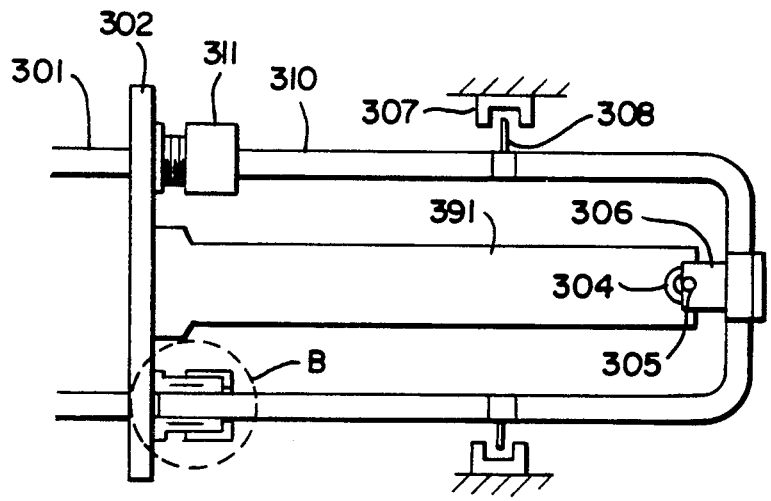
FIG. 5(A) is a plan view of an example of an alternative pipe coupling.
Figure 5B:
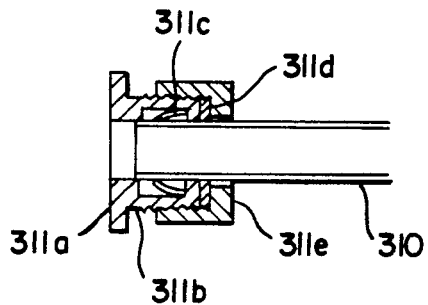
FIG. 5(B) shows details of this example.

FIG. 5(A) is an explanatory construction view for an example of pipe couplings for connecting metallic and non-metallic flow conduits. The curved conduit 310 is made of a suitable material as described previously. Curved conduit 310 is connected with the supporting member 302 through a mount 311. As shown in FIG. 5(B) the mount 311 comprises a fixture 311a, made of PTFE or the like, having a passage for inserting the glass conduit 310, and an end surface to be fixedly attached to the supporting member 302 by means of a bolt or the like, a tapered washer 311c, made of PTFE or the like having a tapered surface brought into contact with the other end surface of the fixture 311a, packing 311d of PTFE or the like, and a screw cap 311e made of type 5052 aluminum-magnesium alloy or the like engaged with a threaded portion 311b formed on the outer circumferential surface of the fixture 311a for pressing the tapered washer 311c through the packing 311d toward the fixture 311a and thereby fixedly joining the conduit 310 to the mount 311.

Figure 6A:
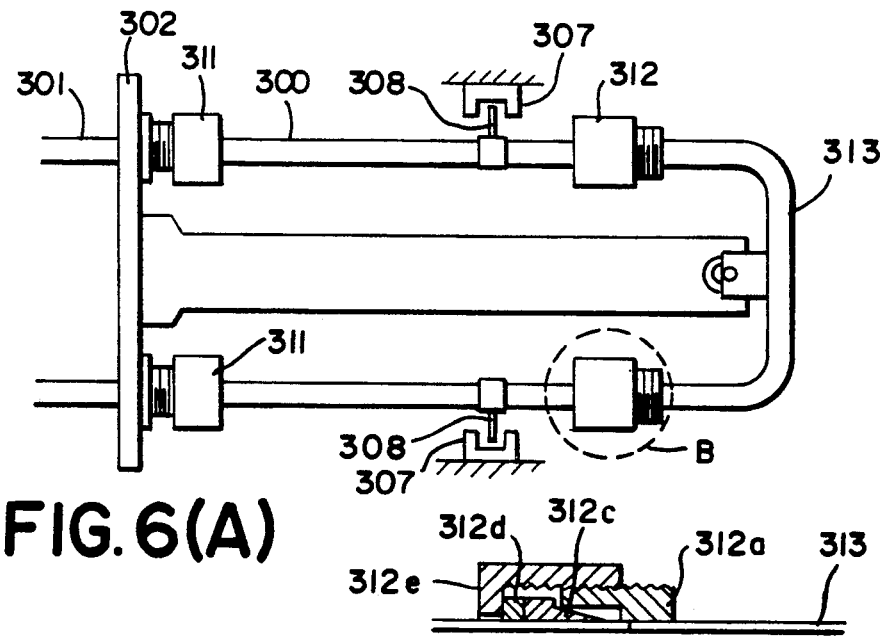
FIG. 6(A) is a plan view of a second example of an alternative pipe coupling.

FIG. 6(A) is an explanatory construction view for an alternative example of pipe couplings for connecting metallic and non-metallic flow conduits. In this example, only the straight portions of the conduit 310 of FIG. 5 are constructed of a glass, ceramic or glass-ceramic conduit 300 and the curved portion 313 is constructed of a metallic material as typically used in prior art meters. In particular, it is used when corrosion resistance is more critical for the straight sections shown. The conduit 300 and the curved pipe 313 are connected with each other by the use of a coupling 312.

Figure 6B:
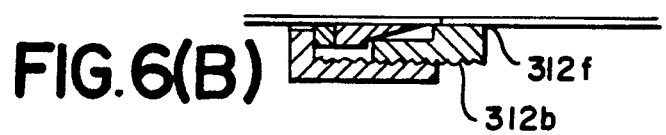
FIG. 6(B) illustrates details of this example.

As shown in FIG. 6(B), the coupling 312 is constructed in a similar way to the mount 311 shown in FIG. 5. Namely, a coupling 312a made of PTFE or the like, through which is inserted the end opening portion of the curved tube 313, is fixed on the curved pipe by bonding it at the position 312f, and a screw cover 312e made of type 5052 aluminum-magnesium alloy or the like is threadedly engaged with the coupling 312a by putting a tapered washer 312c and a packing 312d, each of PTFE or the like, therebetween. The coupling 312 is firmly attached to the curved pipe 313 in that way. The connection of the conduit 300 with the supporting member 302 is accomplished by use of a mount 311 in the same way as in FIG. 5.

In FIG. 5 the curved conduit, which is a main portion of the Coriolis flow meter and according to the present invention, is constructed of glass, ceramic or glass-ceramic, having a small thermal expansion coefficient, and small Young's modulus variation. Consequently, it is not necessary to compensate for the accuracy of the flow rate by use of complicated means such as a temperature compensating device or the like. Furthermore, it will prove to be quite chemically resistant. Therefore, it will be possible to provide a mass flow meter at low-cost and which has a wide range of application. And further, since the main part of the mass flow meter is made of transparent glass tubing, in the case where a transparent material is chosen from the possible suitable materials, the condition of the fluid flow can be observed with the naked eyes. Therefore, such a construction is profitable and useful for observing various flow regimes.

Moreover, in the coupling embodiment shown in FIG. 6, only the straight tube portions are constructed of glass. Therefore, even in cases where a portion of the glass conduit near the metal mount 311 is broken because of the concentration of stress, the damaged conduit can be easily exchanged for another one. The device can be easily transported and can be made at low-cost.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

We claim:
1. A mass flow meter comprising:
   a. at least one flow conduit fashioned from a heat-resistant, corrosion-resistant non-metallic material having a thermal expansion coefficient between $51.5 \times 10^{-7}/°$ C. and about $0.5 \times 10^{-7}/°$ C., and a Young's modulus between about $10.5 \times 10^6$ PSI and about $7.4 \times 10^6$ PSI,
   b. pipe coupling means for resiliently grasping said flow conduit, said coupling means relaying flow to and from said conduit,
   c. a primary support means to which said pipe coupling means is solidly mounted,
   d. means for oscillating said flow conduit, whereby said oscillations generate Coriolis forces when fluid is flowed through said conduit and said Coriolis forces cause flow conduit deflections,
   e. means for detecting said flow conduit deflections, which detecting means produce motion signals, the phase differences of said motion signals are proportional to mass flow rate.

2. A coriolis mass flow meter as in claim 1, wherein said at least one flow conduit further comprises:
   a. a pair of flow conduits wherein each said flow conduit is coupled, mounted, oscillated, and detected as in claim 1, and
   b. each said flow conduit is made from such non-metallic material, selected from the group consisting of: quartz glass, glass, ceramic, glass-ceramic, fused quartz, titanium silicate glass, silica glass, fused silica glass, lithium-aluminosilicate glass-ceramic, and borosilicate glass.

3. A coriolis mass flow meter as in claim 1, said pipe coupling means further comprising:
   a. a resilient fixture, with two ends and an exterior threaded portion, the fixture having a passage for inserting the conduit into the fixture and one end surface fixedly attached to said primary support,
   b. a resilient tapered washer with two surfaces having one tapered surface brought into contact with the other end surface of said fixture,
   c. resilient packing brought into contact with the other surface of said washer, and
   d. a screw cap with an inner threaded portion engaged with the threaded exterior portion of said fixture such that said packing and washer are contained within said engaged cap and fixture, and such that said washer is pressed through said packing by screwing said cap further onto said fixture.

4. A Coriolis mass flow meter as in claim 1, further comprising:
   means for limiting the displacement of said flow conduit, said limiting means fixed relative to said conduit and engaged with said conduit, fitting around said flow conduit at a location of maximum displacement of said conduit when it is oscillated, said limiting means forming a gap between said flow conduit and itself having a distance less than the resilient displacement limit of said conduit.

5. A Coriolis mass flow meter as in claim 1, further comprising an auxiliary support means comprising:
   a. connector bar means attached to said flow conduit,
   b. holding plate means attached to said primary support means,
   c. clamp means attached resiliently between said connector bar means and said holding plate means.

6. A Coriolis mass flow meter as in claim 1, further comprising:
   a. each such flow conduit made of two straight sections made of such non-metallic material, coupled to each end, respectively, of a curved metallic section by a tube section coupling;
   b. such tube section couple further comprising:
      (i) a resilient threaded coupling having two ends and with an external threaded portion, bonded at one end to the curved metallic section;
      (ii) a resilient tapered washer with two surfaces having one surface brought into contact with the other end surface of said threaded coupling;
      (iii) resilient packing brought into contact with the other surface of said washer; and
      (iv) a screw-cap with an inner threaded portion engaged with the threaded exterior portion of said threaded coupling such that said packing and washer are contained within such engaged cap and threaded coupling, and such that said washer and packing are pressed about one end of such non-metallic straight section, coupling it to such curved metallic section.

7. A Coriolis mass flow meter comprising:
   a. a flow conduit structure, constructed of a heat-resistant, corrosion-resistant material having a thermal expansion coefficient between $51.5 \times 10^{-7}/°$ C. and about $0.5 \times 10^{-7}/°$ C., and a Young's modulus between $10.5 \times 10^6$ PSI and about $7.4 \times 10^6$ PSI comprising a pair of curved conduits of the same shape and of the same size symmetrically situated about a first axis, each said conduit having an inlet opening and an outlet opening,
   b. an inlet flow divider having an inlet opening and two outlet openings,
   c. an outlet flow combiner having an outlet opening and two inlet openings,
   d. said flow conduits connected at their respective inlet openings to said inlet flow divider outlet openings,
   e. said flow conduits connected at their respective outlet openings to said outlet flow divider inlet openings,
   f. an inlet pipe coupling having a passage connecting an inlet opening and an outlet opening, said inlet opening adapted to connect to a conduit external to said flow conduits; and said outlet opening adapted to connect solidly and resiliently to said flow divider inlet opening,
   g. an outlet pipe coupling having a passage connecting an inlet opening and an outlet opening, said outlet opening adapted to connected a conduit external to said flow conduits and said inlet opening adapted to connect solidly and resiliently to said flow combiner outlet opening,
   h. a fixing plate connected to said inlet pipe coupling at a location between said inlet pipe coupling inlet and outlet openings and connected to said outlet pipe coupling at a location between said outlet pipe inlet and outlet openings,
   i. a relay plate connected to said inlet pipe coupling at a location between said fixing plate and said inlet pipe coupling outlet and connected to said outlet pipe coupling at a location between said fixing plate and said outlet pipe coupling inlet, j. a first supporting plate connecting said flow conduits to each other at a first point, k. a second supporting plate connecting said flow conduits to each other at a second point, l. said first and second points lying along a second axis, said second axis perpendicular to said first axis, m. one or more connecting bars disposed between said conduits, said connecting bars connected to said conduits at locations between said flow divider and said first point and at locations between said second point and said flow combiner, n. a holding plate connected to said relay plate, o. a clamp resiliently connecting said connecting bar to said holding plate, p. a bracket mounted to said flow conduit, said bracket parallel to said second axis, q. a driver mounted on said bracket at a point along said first axis, said driver oscillating said flow conduits about said second axis, said oscillations inducing deflections in said flow conduits about said first axis, r. a pair of motion sensors mounted on said bracket opposite to each other and symmetrical to said first axis, said motion sensors producing motion signals, the phase differences of said signals being proportional to mass flow rate;

s. terminal plate means attached to said holding plate, t. means for transmitting said motion signals attached to said motion sensors and said terminal plate means.

8. A Coriolis mass flow meter as in claim 7, wherein said flow divider inlet is comprised of a flow tube collar located at the inlet opening and said flow combiner outlet is comprised of a flow tube collar located at the outlet opening, and wherein said pipe coupling comprises:

a. a first member comprising a cylindrical body having a first member collar portion on one end of said pipe coupling and a ring-shaped, recessed portion on the outer circumference of the central portion thereof and having a passage of a large inner diameter in the vicinity of said first member collar portion, b. a second threaded member having a seal firmly inserted into and engaged with said passage of said first member making it liquid-tight, a resin lining formed in the interior thereof, and a threaded portion formed at the end portion of said resin lining for connecting with the external conduit, c. a third cylindrical resin member inserted into the inner diameter of said first member and having a passage of an enlarged inner diameter at the end portion thereof, d. a ring-shaped seal directly contacting the enlarged inner end portion of said third member, e. a ring-shaped resin having a treated lining and having an end surface contacting said ring-shaped seal, f a fourth member having a fourth member collar portion having a cylindrical portion firmly inserted into the large inner diameter of said first member, g. a fifth member provided with a fifth member collar portion having a cylindrical portion having a treated ring-shaped resin lining, and h. a metal mount having a protruding portion firmly inserted into the ring-shaped recess portion of said first member, wherein said first member is fixed in relay fashion, on the relay plate at the first member collar portion and on the fixing plate by means of said metal mount, said second member is screwed into the passage of said first member, said third member, said ring-shaped sealing material and said fourth member are loosely inserted in order and in serial fashion into the large inner diameter portion and the same are respectively fixed on the collar portion of said fourth member, the end portion of said curved conduit is further loosely inserted into the enlarged inner diameter portion of said third member, the flow tube collar portion of each of flow divider and flow combiner is grasped by the ring-shaped lining portions of said fourth and fifth members, said fourth and fifth members are respectively fixed on each flow tube collar portion, the external conduit is fixedy mounted on said fixing plate and said curved conduit is inserted into and circumferentially enclosed by the enlarged inner diameter end portion of said third member.

9. A Coriolis mass flow meter, as in claim 7, wherein said holding plate comprises a supporting arm extending in parallel with the first axis; and wherein said clamp comprises a first connecting bar fixing plate being fixed on said supporting arm, a second connecting bar fixing plate resiliently supported in parallel with said first connecting bar fixing plate, a supporting means for resiliently supporting said connecting bar, and a resilient plate fixedly installed on said supporting means opposite to said first and second connecting bar fixing plates.

10. A Coriolis mass flow meter, as in claim 7, wherein said curved conduit is attached to said bracket by a two sided adhesive tape means.

11. A Coriolis mass flow meter, as in claim 7, comprising a disc-shaped fixing plate, contacting with and fixedly attached to a disc-shaped body by means of a sealing member, comprising said disc-shaped body attached to a cylindrical housing, said housing provided with a view port therein positioned in relation to said conduits to permit the viewing of said curved conduits.

12. A Coriolis mass flow meter, as in claim 7, further comprising flow conduit end portions, a housing, and an E-shaped adaptor having a gap therein, said gap corresponding to the displacement allowable for each of the end portions, said adaptor rotatably mounted on said housing to accommodate the passage of the adaptor through the gap when said adaptor is rotated.

13. A Coriolis mass flow meter as in claim 7, further comprising a curved spring member, a housing connected to said fixing plate, said housing having an inner wall surface, said curved spring member having a first end portion fixed on the inner wall surface of said housing and a second end portion installed so as to displaceably pass through the wall of said housing in the direction of said housing diameter, wherein said curved spring member is engaged with the tip end portion of one of said curved conduits while said flow meter is being transported, and said curved spring member is released when said flow meter is put into operation.

14. A Coriolis mass flow meter comprising:

a. a pair of curved flow conduits, each said flow conduit constructed of a heat-resistant, corrosion-resistant material having a thermal expansion coefficient between about $51.5 \times 10^{-7}/°$ C. and about $0.5 \times 10^{-7}/°$ C., and a Young's modulus between about $10.5 \times 10^6$ PSI and about $7.4 \times 10^6$ PSI, each said flow conduit being symmetrical about a first axis, each said flow conduit having an inlet opening and an outlet opening, b. pipe coupling means for coupling said flow conduits to a conduit external to said flow conduits, said pipe coupling means defining passages having first and second ends, said conduit openings inserted resiliently into said first end and said second ends adapted to attach to said external conduit, c. fixing plate means for supporting said pipe coupling means attached to said pipe coupling means between said second pipe coupling end and said external conduit, d. relay plate means for supporting said pipe coupling means attached to said pipe coupling means between said fixing plate means and said conduit openings, e. said pipe coupling means solidly mounting said flow conduits to said fixing plate means and said relay plate means, f. supporting plate means for supporting said flow conduits attached between said flow conduits at a first point and a second point, said attachment point symmetrical about said first axis and along a second axis defined by said two points of attachment of said flow conduits, said second axis perpendicular to said first axis, g. connecting bar means for connecting said flow conduits disposed between said inlet openings and said outlet openings of sad conduits, said connecting bar means located between said flow conduit ends and said supporting plate means, h. means for clamping said connecting means resiliently to said relay plate means, i. means for oscillating said flow conduits about said second axis, said oscillating means attached to said flow conduits along said first axis, said oscillations inducing deflections in said flow conduits about said first axis, j. means for detecting motion attached to each said flow conduit at points along said flow conduits symmetrical to said first axis, said detecting means producing motion signals, the phase differences of said signals being proportional to mass flow rate; and k. means for transmitting said motions signals, said transmission means attached to said motion detecting means.

* * * * *